(12) United States Patent
Shibayama et al.

(10) Patent No.: US 6,753,991 B2
(45) Date of Patent: Jun. 22, 2004

(54) OPTICAL RECORDING APPARATUS

(75) Inventors: Yasuyuki Shibayama, Ibaraki (JP); Keiji Kataoka, Ibaraki (JP)

(73) Assignee: Hitachi Printing Solutions, Ltd., Ebina (JP)

( * ) Notice: Subject to any disclaimer, the term of this patent is extended or adjusted under 35 U.S.C. 154(b) by 0 days.

(21) Appl. No.: 10/355,155

(22) Filed: Jan. 31, 2003

(65) Prior Publication Data

US 2003/0151826 A1 Aug. 14, 2003

(30) Foreign Application Priority Data

Feb. 1, 2002 (JP) ..................................... P.2002-025567

(51) Int. Cl.⁷ ........................... G02B 26/08; G02B 3/06
(52) U.S. Cl. ..................................... 359/205; 359/710
(58) Field of Search ............................. 359/204, 205, 359/206, 668, 710

(56) References Cited

FOREIGN PATENT DOCUMENTS

| JP | 04-101112 | 4/1992 |
| JP | 08-015625 | 1/1996 |
| JP | 09-109458 | 4/1997 |

*Primary Examiner*—David N. Spector
(74) *Attorney, Agent, or Firm*—McGinn & Gibb, PLLC

(57) ABSTRACT

An optical recording apparatus includes an optical system, a photosensitive drum and a rotational mechanism. Multibeam laser light is focused through the optical system to form an image as a column of image-forming beam spots on the photosensitive drum. The column of image-forming beam spots is arranged obliquely on the photosensitive drum and scanned to perform optical recording. The optical system includes a resolution converting lens system which is detachably attached into the optical system. The rotating mechanism adjusts rotation of the resolution converting lens system around an optical axis thereof. The resolution converting lens system is rotated by the rotating mechanism to change of resolution of the recording image. The resolution converting lens system is attached into and detached from the optical system to change of resolution of the recording image.

9 Claims, 7 Drawing Sheets

OPTICAL RECORDING APPARATUS

BACKGROUND OF THE INVENTION

1. Field of the Invention

The present invention relates to an optical recording apparatus such as a laser beam printer for performing optical recording by scanning and modulating laser beams.

2. Background Art

As examples in the related art, there are Japanese Patent Laid-Open No. 101112/1992, Japanese Patent Laid-Open No. 15625/1996 and Japanese Patent Laid-Open No. 109458/1997.

Japanese Patent Laid-Open No. 101112/1992 has disclosed a multibeam scanning optical system including: a multibeam light source constituted by a plurality of semiconductor lasers arranged in a row in a subsidiary scanning direction; a rotary polygon mirror for deflecting multibeam light from the light source and scanning the multibeam light on a photosensitive drum; and an adjusting member constituted by two lens groups, namely a front lens group and a rear lens group, and provided in an optical path between the multibeam light source and the rotary polygon mirror; wherein the distance between the front lens group and the rear lens group is relatively changed to change the focal lengths of the two lens groups to thereby change image-forming magnification and adjust a light beam interval in the subsidiary scanning direction on the photo sensitive drum.

Japanese Patent Laid-Open No. 15625/1996 has described an optical system including: a light source for emitting a plurality of beams; a main scanning unit for collimating the plurality of light beams emitted from the light source, deflecting the light beams and mainly scanning the light beams on a photosensitive drum; and first and second lens systems each having lens power only in a subsidiary scanning direction and disposed between the light source and the main scanning unit; wherein the first and second lens systems are adjusted to move in a direction of an optical axis so that an image is formed from the plurality of incident beams by the main scanning unit while the interval between adjacent ones of the light beams on the photosensitive drum and the size of each of the light beams are adjusted to obtain a target light beam size.

Japanese Patent Laid-Open No. 109458/1997 has disclosed an optical recording apparatus including: a multibeam generating unit generating beams capable of being modulated in intensity independently; a rotary polygon mirror for collectively deflecting and scanning the plurality of light beams emitted from the multibeam generating unit, and scanning lenses for converging each of the light beams into a predetermined spot size on a scanning surface, wherein when resolution of a recording image is changed, a lens unit is newly provided in the optical system of the optical recording apparatus to adjust both the size of each of the image-forming beam spots and the scanning line interval in accordance with the resolution.

SUMMARY OF THE INVENTION

In the configuration described in each of Japanese Patent Laid-Open No. 101112/1992 and Japanese Patent Laid-Open No. 15625/1996, lenses disposed in the optical system are displaced to change the focal lengths of the lenses to thereby adjust the scanning line interval finely. Hence, there is a disadvantage in that the configuration cannot be adapted to the case where the scanning line interval varies largely as represented by conversion of resolution.

In the configuration described in Japanese Patent Laid-Open No. 109458/1997, the total magnification of the optical system in the main scanning direction and the total magnification of the optical system in the subsidiary scanning direction are changed equally by the newly provided lens unit. Hence, the chief rays of the beams are spread in the main scanning direction in the incident surface of the rotary polygon mirror, so that the beams are partially shaded by the edge of the reflection surface of the rotary polygon mirror. Hence, there is a problem that a wide scanning region cannot be retained. Moreover, when arrangement error, especially flap angle error occurs in the newly provided lens unit, there is another problem that imbalance easily occurs between the scanning line interval at the start of scanning and the scanning line interval at the end of scanning. In addition, there is a further problem that the scanning line interval cannot be adjusted independently in accordance with the resolution of the recording image.

The invention is attained in consideration of the problems in the related art and an object of the invention is to provide an optical recording apparatus for performing optical recording by forming an image from a plurality of beams on a photosensitive drum and scanning the plurality of beams, in which images different in resolution can be recorded without spoiling an effective scanning width and which has an adjusting unit for adjusting beam spots formed as an image on the photosensitive drum and the scanning line interval by an easy and tolerant adjusting mechanism, the adjustment being performed independently in accordance with resolution of a recording image.

To achieve the foregoing object, according to the invention, there is provided an optical recording apparatus in which a resolution converting lens system constituted by a spherical lens and first and second cylindrical lenses having lens power only in a subsidiary scanning direction is controlled to be detachably attached into an optical system newly so as to make it possible to attain a recording image different in resolution. On this occasion, the spherical lens is disposed in a position a satisfying the expressions (A) and (B)

$$a^2 + (HHS3+\delta) \cdot a - (HHS3+\delta) \cdot fS3 = 0 \quad \text{(A)}$$

$$\delta = (t1+t2) - (n1 \cdot t2 + n2 \cdot t1)/(n1 \cdot n2) \quad \text{(B)}$$

in which a is a distance from a position of a front focal point of rear one of lenses constituting abeam expander in the optical system to the position of the input side principal surface of the spherical lens, fS3 is the focal length of the spherical lens, HHS3 is the distance between the input side principal surface and the output side principal surface of the spherical lens, n1 is the refractive index of the first cylindrical lens, n2 is the refractive index of the second cylindrical lens, t1 is the thickness of the center of the first cylindrical lens, and t2 is the thickness of the center of the second cylindrical lens.

Further, in the optical recording apparatus, when resolution of the recording image is changed from α (dpi) to β (dpi), the resolution converting lens system detachably attached into the optical system converts the total magnification of the optical system to satisfy the condition represented by the expressions (C) and (D)

$$m_{main} < m_{main}' \leq (\alpha/\beta) m_{main} \quad \text{(C)}$$

$$m_{sub}' = (\alpha/\beta) m_{sub} \quad \text{(D)}$$

in which $m_{main}$ is the total magnification of the optical system in a main scanning direction at resolution of α (dpi), $m_{sub}$ is the total magnification of the optical system in a subsidiary scanning direction at resolution of α (dpi), $m_{main}'$ is the total magnification of the optical system in the main scanning direction at resolution of β (dpi), and $m_{sub}'$ is the total magnification of the optical system in the subsidiary scanning direction at resolution of β (dpi). In addition, in the optical recording apparatus, a rotating mechanism for adjusting the rotation of the resolution converting lens system around an optical axis is provided to make it possible to adjust a scanning line interval on the photosensitive drum, and the resolution converting lens system is disposed in a position where the rotation angle of the resolution converting lens system around the optical axis and the rate of change of the scanning line interval satisfy the expression (E)

$$0 \leq |\Delta Prate/\Delta \gamma| < \frac{1}{2} \quad (E)$$

in which Δ Prate is the rate of change of the scanning line interval in accordance with the rotation of the resolution converting lens system around the optical axis, and Δγ is the rotation angle (deg) of the resolution converting lens system around the optical axis.

Incidentally, in the optical recording apparatus, when resolution of the recording image is changed from α (dpi) to β (dpi), the resolution of the recording image is converted by detachably attaching the resolution converting lens system into the optical system on the basis of an instruction given from a controller while changing both the rotational speed of a rotary polygon mirror and the modulating speed of the image-forming beam spots to (β/α) times, the rotary polygon mirror serving as one of constituent components of the optical system, the image-forming beam spots being scanned on the photosensitive drum.

Alternatively, when resolution of a recording image is changed from α (dpi) to β (dpi), a resolution converting lens system constituted by two cylindrical lenses having lens power only in a subsidiary scanning direction is controlled to be newly detachably attached to a light output side of rear one of lenses constituting the beam expander provided in the optical system. In this case, to convert the magnification of the optical system in the subsidiary scanning direction to thereby convert resolution of the recording image in the optical recording apparatus, the resolution converting lens system satisfies the expressions (F) and (G)

$$b = fS1 + fS2 \quad (F)$$

$$|fS2/fS1| = \beta/\alpha \quad (G)$$

in which $\underline{b}$ is the distance between principal surfaces of the cylindrical lenses constituting the resolution converting lens system, fS1 is the focal length of front one of the cylindrical lenses constituting the resolution converting lens system, and fS2 is the focal length of rear one of the cylindrical lenses constituting the resolution converting lens system.

Incidentally, the resolution converting lens system detachably attached into the optical system is provided with a rotating mechanism for adjusting the rotation of the rotation converting lens system around the optical axis to thereby make it possible to adjust a scanning line interval on the photosensitive drum, and the resolution converting lens system is disposed in a position where the rotation angle of the resolution converting lens system around the optical axis and the rate of change of the scanning line interval satisfy the expression (H)

$$0 \leq |\Delta Prate/\Delta \gamma| < \frac{1}{2} \quad (H)$$

in which Δ Prate is the rate of change of the scanning line interval in accordance with the rotation of the resolution converting lens system around the optical axis, and Δγ is the rotation angle (deg) of the resolution converting lens system around the optical axis.

DETAILED DESCRIPTION OF THE PREFERRED EMBODIMENTS

Embodiments of the invention will be described below with reference to the drawings.

Embodiment 1

Figure 1:
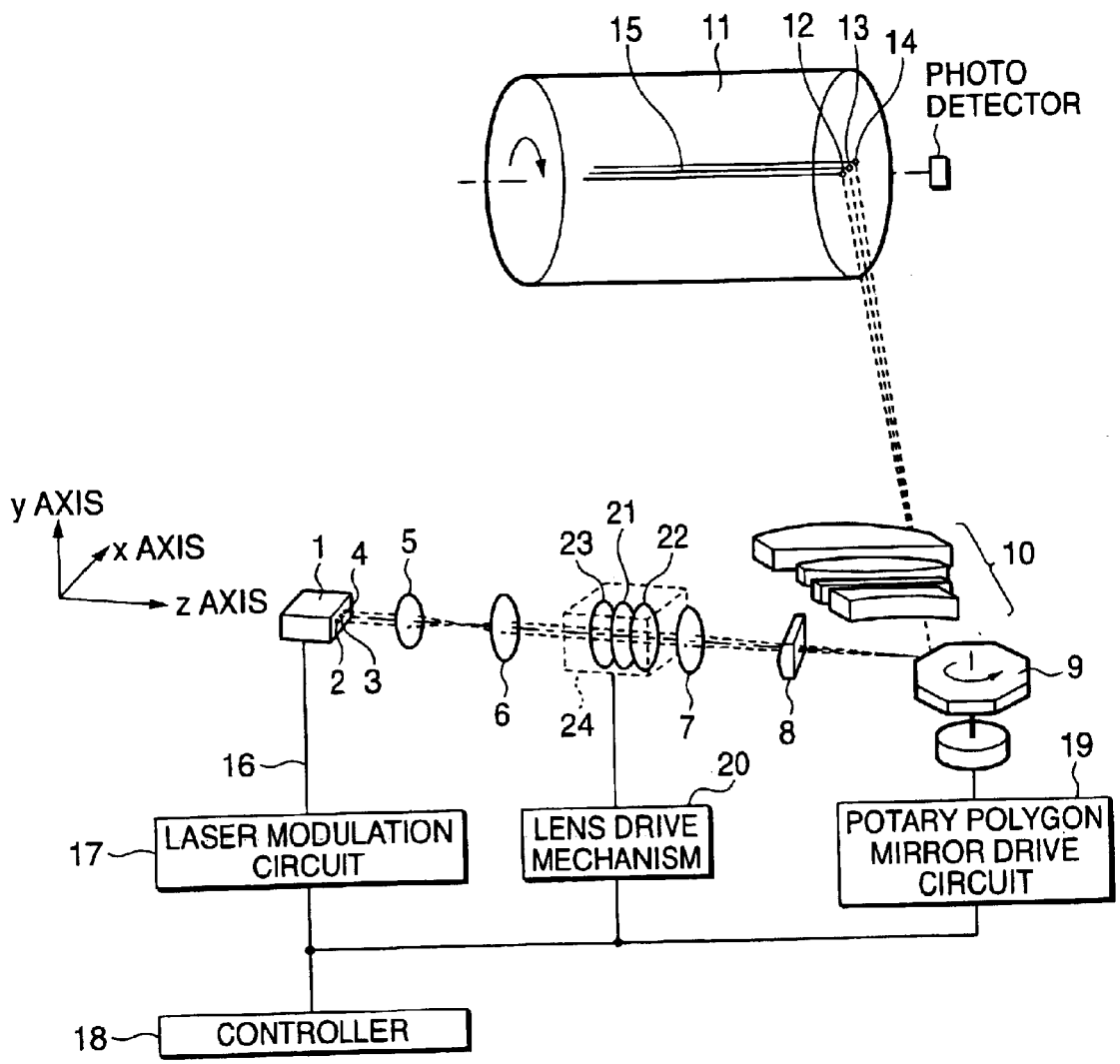
FIG. 1 is a schematic diagram showing the overall configuration of an optical recording apparatus according to the invention.

FIG. 1 is a diagram showing the overall configuration of an optical system in an optical recording apparatus according to a first embodiment of the invention. A multibeam light source 1 for emitting a plurality of beams emits individual beams 2 to 4 independently modulated in accordance with a print data signal 16. (In this embodiment, configuration of three beams is shown as an example). The beams emitted from the multibeam light source 1 are collimated by a lens 5 and then enter a lens 6. The beams are converted into parallel beams with enlarged beam widths by a beam expander which is constituted by a combination of the lens 6 and a lens 7.

Then, the beams are transmitted through a cylindrical lens 8 having lens power only in a subsidiary scanning direction. Then, the beams are converged by a rotary polygon mirror 9 and a scanning lens 10 to thereby form an image as a column of image-forming beam spots on a photosensitive drum 11. The beam spots individually modulated are scanned to thereby perform optical recording on the photosensitive drum 11. On this occasion, the plurality of beam spots 12 to 14 formed as an image on the photosensitive drum 11 are formed to have an inclination angle so that scanning lines constituted by the image-forming beam spots respectively come near to one another.

The inclination angle is set by adjustment of the rotation of the multibeam light source 1 around the optical axis. A cylindrical lens 8 disposed in front of the rotary polygon mirror 9 is provided in order to eliminate displacement of the scanning lines in a subsidiary scanning direction due to the fluctuation of the rotary polygon mirror 9 at the time of the rotation of the rotary polygon mirror 9. The respective beams are narrowed in a subsidiary scanning direction onto a surface of the rotary polygon mirror 9 by the cylindrical lens 8.

Figure 2:
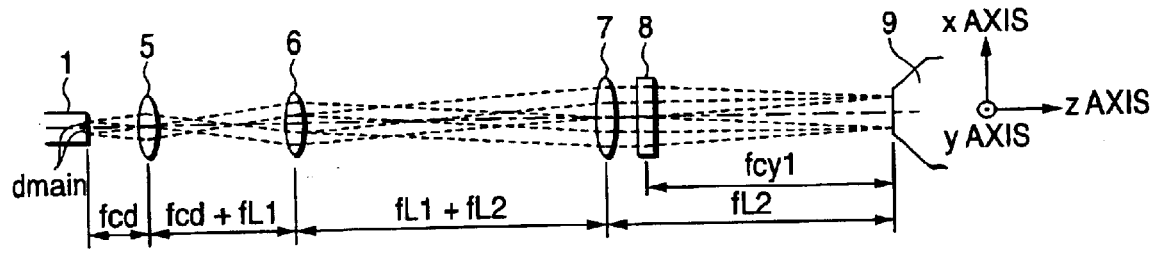
FIG. 2 shows an optical system provided in front of a rotary polygon mirror and viewed in a main scanning direction in the optical recording apparatus according to the invention.
Figure 3:
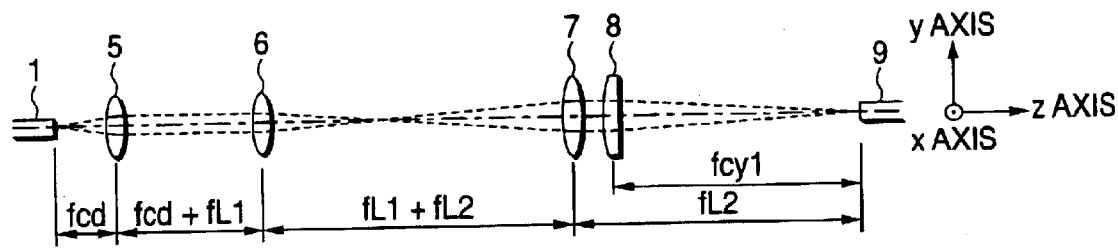
FIG. 3 shows the optical system provided in front of the rotary polygon mirror and viewed in a subsidiary scanning direction in the optical recording apparatus according to the invention.

FIGS. 2 and 3 are detailed diagrams showing the positions of arranged components in the optical system shown in FIG. 1. FIG. 2 shows the optical system viewed in a plane of rotation of the rotary polygon mirror 9, that is, the optical system viewed in a main scanning direction on the photosensitive drum 11. FIG. 3 shows the optical system viewed in a direction perpendicular to the main scanning direction, that is, the optical system viewed in a subsidiary scanning direction.

In FIGS. 2 and 3, when the focal lengths of the lenses 5, 6, 7 and 8 are fcol, fL1, fL2 and fcyl respectively, the distance between the multibeam light source 1 and the lens 5, the distance between the lenses 5 and 6, the distance between the lenses 6 and 7 and the distance between the lens 7 and the rotary polygon mirror 9 are arranged to be substantially equal to fcol, fcol+fL1, fL1+fL2 and fL2 respectively.

In the arrangement, in FIG. 2, the chief rays of the laser beams emitted in parallel with one another from the multibeam light source 1 become parallel with one another again after they exit from the lens 6, so that the lens 7 is irradiated with the parallel rays. The chief rays of the beams then exiting from the lens 7 can be substantially coincident with predetermined positions on the rotary polygon mirror 9. Hence, even in the case where a plurality of beams are used, a related-art rotary polygon mirror can be used without necessity of increasing the size of the rotary polygon mirror 9.

Next, the laser beams emitted from the multibeam light source 1 will be described with reference to FIG. 2.

When the size of each of the beam spots emitted from the multibeam light source 1 and the interval between adjacent ones of the beams are $\delta$ ($\mu$m) and $d_{main}$ (mm) respectively, the size D of each of output beams from the lens 7 is given by the expression:

$$D = 4 \cdot \lambda \cdot fcol \cdot fL2 / (fL1 \cdot \pi \cdot \delta) \text{ (mm)} \quad (1)$$

in which $\lambda$ is the wavelength of the light beam.

On the other hand, the optical system viewed in the subsidiary scanning direction in FIG. 3 is equal to the optical system in FIG. 2 in that beams output from the lens 7 become parallel light beams with a beam size $D = 4 \cdot \lambda \cdot fcol \cdot fL2/(fL1 \cdot \pi \cdot \delta)$. In the optical system in FIG. 3, however, the beams output from the lens 7 are narrowed onto the rotary polygon mirror 9 by the cylindrical lens 8. When the size (vertical size) of each of the beam spots narrowed in the subsidiary scanning direction onto the rotary polygon mirror 9 on this occasion is $\delta'$ ($\mu$m), $\delta'$ is given by the following expression.

$$\delta' = ((fL1 \cdot fcyl)/(fcol \cdot fL2))\delta(\mu m) \quad (2)$$

When the interval between adjacent ones of the beam spots narrowed in the subsidiary scanning direction onto the rotary polygon mirror 9 is P, P has relation to the following expression.

$$P \propto ((fL1 \cdot fcyl)/(fcol \cdot fL2)) \quad (3)$$

Figure 4:
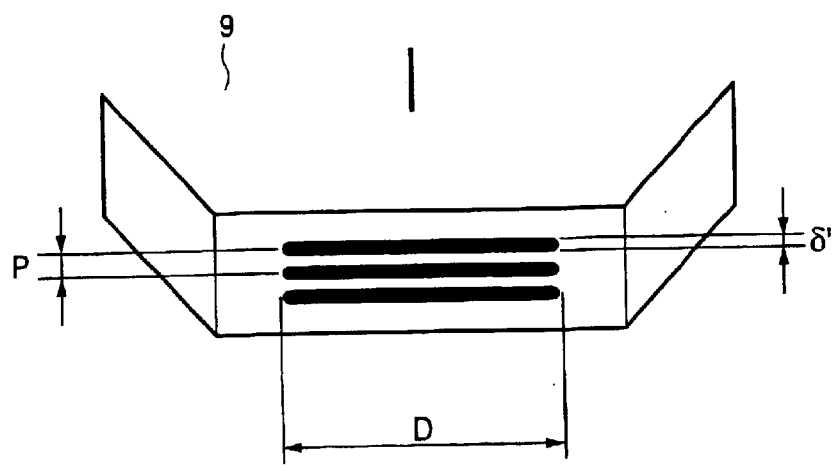
FIG. 4 is a view showing beams on the rotary polygon mirror.

Hence, as shown in FIG. 4, beam spots each having a horizontal size D (mm) and a vertical size $\delta'$ ($\mu$m) and arranged at intervals of P are formed on a reflection surface of the rotary polygon mirror 9.

The beams reflected by the rotary polygon mirror 9 form an image on the photosensitive drum 11 through the scanning lens 10. When the focal length of the scanning lens 10 on this occasion is fF$\theta$, the size of each of spots formed as an image on the photosensitive drum is given by the following expressions:

$$\omega x = ((fL1 \cdot fF\theta)/(fcol \cdot fL2))\delta(\mu m) \quad (4)$$

$$\omega y = m\delta' = m((fL1 \cdot fcyl)/(fcol \cdot fL2))\delta(\mu m) \quad (5)$$

in which $\omega x$ is the size of each of the spots formed as an image in the main scanning direction, $\omega y$ is the size of each of the spots formed as an image in the subsidiary scanning direction, and $\underline{m}$ is the magnification of the scanning lens 10 in the subsidiary scanning direction.

That is, the total magnification of the optical system is given by the following expressions:

$$m_{main} = \omega x/\delta = ((fL1 \cdot fF\theta)/(fcol \cdot fL2)) \quad (6)$$

$$m_{sub} = \omega y/\delta = m((fL1 \cdot fcyl)/(fcol \cdot fL2)) \quad (7)$$

in which $m_{main}$ is the total magnification of the optical system in the main scanning direction, and $m_{sub}$ is the total magnification of the optical system in the subsidiary scanning direction.

As will be described later, the column of spots formed as an image and arranged on the photosensitive drum 11 forms a low angle with respect to the scanning line. Hence, when the interval between adjacent ones of beam spots formed as an image is d', d' is approximately given by the following expression in accordance with the expression (5).

$$d_{main}' \approx m_{main} \cdot d_{main} = d_{main} \cdot ((fL1 \cdot fF\theta)/(fcol \cdot fL2)) \text{ (mm)} \quad (8)$$

When the inclination of image-forming multibeam spots with respect to the beam scanning direction is $\psi$, the scanning line interval p' is given by the following expression.

$$p' = d_{main}' \cdot \sin \psi = d_{main} \cdot ((fL1 \cdot fF\theta)/(fcol \cdot fL2)) \cdot \sin \psi \text{(mm)} \quad (9)$$

Assume now the case where resolution of a recording image in the optical system is changed from the existing value $\alpha$ (dpi) to $\beta$ (dpi).

The condition necessary or the conversion of resolution is that both the size of each of the image-forming spots in the subsidiary scanning direction and the scanning line interval as represented by the expressions (5) and (9) are changed to ($\alpha/\beta$) times. Because the time for modulating the spots formed as an image can be electrically selected in the main scanning direction, optical change of the size of each of the image-forming spots in the main scanning direction given by the expression (9) is not always necessarily performed in the same manner as in the subsidiary scanning direction. That is, the size of each of the beam spots in the main scanning direction need not be changed to ($\alpha/\beta$) times if it can be changed to a value which is not smaller than the existing value $\omega x$ and not larger than ($\alpha/\beta$) times as large as the existing value $\omega x$.

It is obvious from the expressions (5) and (9) that either of fL1 and fF$\theta$ needs to be changed to ($\alpha/\beta$) times or any one of fcol, fL2 and sin $\psi$ needs to be changed to ($\beta/\alpha$) times in order to change both the size of each of the image-forming spots in the subsidiary scanning direction and the scanning line interval to ($\alpha/\beta$) times simultaneously.

In the optical system shown in FIG. 1, for conversion of resolution, a resolution converting lens system 24 constituted by lenses 21, 22 and 23 is newly inserted in an optical path in front of the lens 7 so that the focal length in the subsidiary scanning direction of the lens 7 having a focal length fL2 can be changed to (β/α) fL2 which is the synthetic focal length of the lens 7 and the lens system 24.

Incidentally, as shown in FIG. 1, for conversion of resolution, the resolution converting lens system 24 is attached/detached into/from the optical path by a lens drive mechanism 20 on the basis of a signal given by a controller 18. Further, when resolution needs to be converted while the processing speed of the optical recording apparatus is kept constant, the rotational speed of the rotary polygon mirror 9 is also changed to (β/α) times by a rotary polygon mirror drive circuit 19 on the basis of a data signal given by the controller 18.

Assume now the case where the resolution of 600 (dot/inch) of the optical recording apparatus is converted into resolution of 480 (dot/inch) by substitution of specific numerical values for the variables in the optical system.

First, assume that the optical recording apparatus has resolution of 600 (dot/inch).

When the size of each of beam spots emitted from the multibeam light source 1, the beam interval, the focal length fcol of the lens 5, the focal length fL1 of the lens 6, the focal length fL2 of the lens 7, the focal length fcyl of the lens 8, the focal length fFθ of the lens 10 and the magnification m of the lens 10 are 5 ($\mu$m), 0.15 (mm), fcol=20 (mm), fL1=200 (mm), fL2=400 (mm), fcyl=200 (mm), fFθ=400 (mm) and m=2 (times) respectively, the interval between adjacent ones of beam spots formed as an image on the photosensitive drum 11 is given as follows.

$$d_{main}'=1.5 \text{ (mm)} \tag{10}$$

The total magnification $m_{main}$ of the optical system in the main scanning direction, the total magnification $m_{sub}$ of the optical system in the subsidiary scanning direction, the size ωx of each of the spots formed as an image in the main scanning direction and the size ωy of each of the spots formed as an image in the subsidiary scanning direction are given as follows.

$$m_{main}=10 \text{ (times)} \tag{11}$$

$$m_{sub}=10 \text{ (times)} \tag{12}$$

$$\omega x=50 \text{ }(\mu m) \tag{13}$$

$$\omega y=50 \text{ }(\mu m) \tag{14}$$

When the angle ψ of the column of spots formed as an image on the photosensitive drum 11 with respect to the scanning line is set as ψ=1.617 (deg), the scanning line interval p' is calculated on the basis of the expression (9) as follows.

$$p'=0.15 \cdot ((200 \cdot 400)/(20 \cdot 400)) \cdot \sin 1.617 = 42.3 \text{ }(\mu m) \tag{15}$$

This scanning line interval p' corresponds to resolution of 600 (dot/inch).

Next, the case where resolution of the recording image in the optical system is changed from 600 (dpi) to 480 (dpi) will be examined.

In this case, the necessary condition is that the scanning line interval is changed to (600/480) times. This necessary condition can be achieved in accordance with the expression (9) when either of fL1 and fFθ is changed to (600/480) times or either of fcol and fL2 is changed to (480/600) times.

Figure 5:
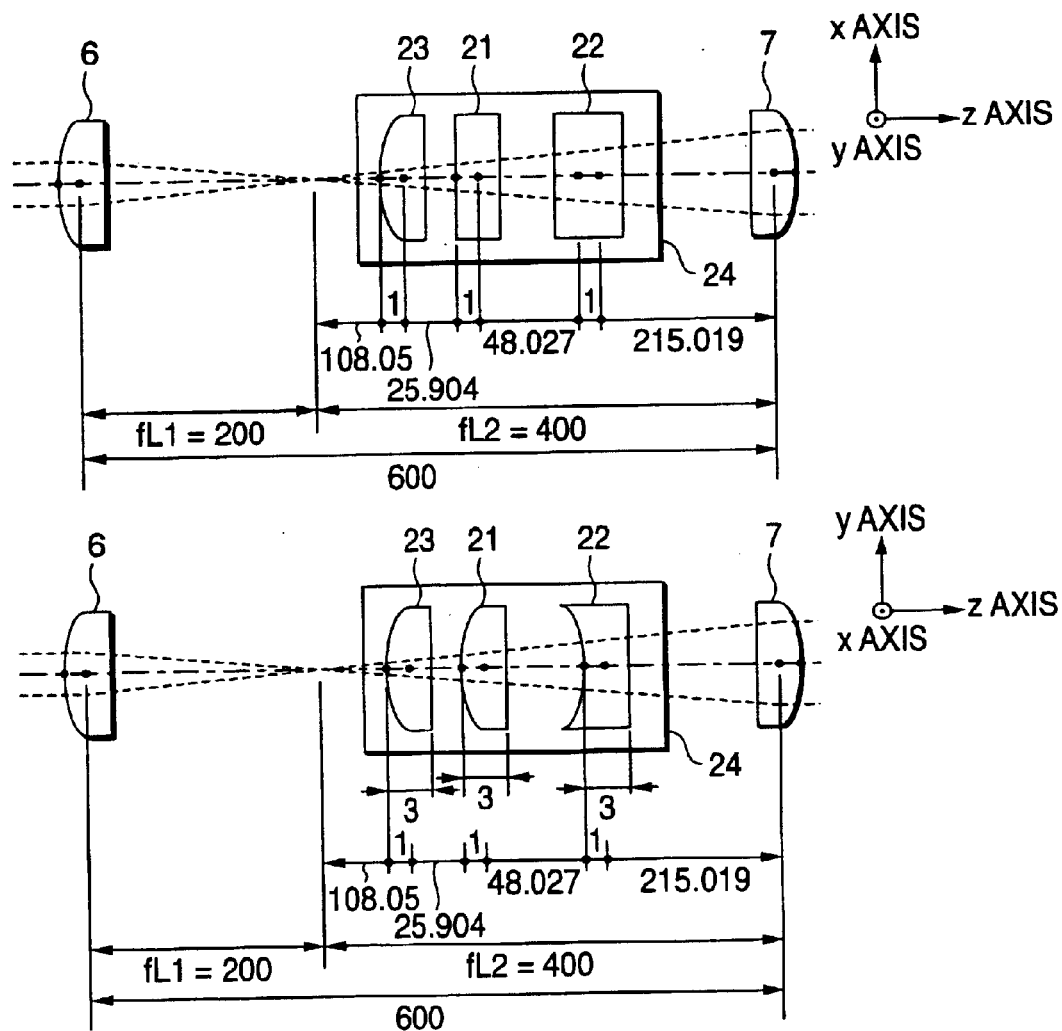
FIG. 5 is a view showing an example of a resolution converting lens system.

FIG. 5 shows an example of design in the invention. In the optical system shown in FIG. 5, a resolution converting lens system 24 constituted by a plano-convex lens 23 with a focal length fs3=4000 (mm), a cylindrical lens 21 with a focal length fs1=200 (mm) and a cylindrical lens 22 with a focal length fs2=−300 (mm), that is, constituted by three lenses in total, is newly provided in front of the lens 7 which is one of lenses 6 and 7 constituting a beam expander. Hence, the synthetic focal length of the lens 7 and the resolution converting lens system 24 is changed to 0.973 times in the main scanning direction (x-direction in FIG. 5) and to 0.8 times in the subsidiary scanning direction (y-direction in FIG. 5). In this example of design, calculation is made upon the assumption that each of the lenses 21, 22 and 23 at a wavelength used has a refractive index of 1.5 and a lens thickness of 3 (mm). Hence, the scanning line interval on the photosensitive drum is changed to (600/480) times as large as the expression (15), that is, p'=52.9 ($\mu$m). On the other hand, in this case, the total magnification $m_{main}'$ of the optical system in the main scanning direction, the total magnification $m_{sub}'$ of the optical system in the subsidiary scanning direction, the size ωx' of each of the spots formed as an image in the main scanning direction and the size ωy' of each of the spots formed as an image in the subsidiary scanning direction are calculated on the basis of the expressions (4) to (7) as follows.

$$m_{main}'=10.3 \text{ (times)} \tag{16}$$

$$m_{sub}'=12.5 \text{ (times)} \tag{17}$$

$$\omega x'=51.3 \text{ }(\mu m) \tag{18}$$

$$\omega y'=62.5 \text{ }(\mu m) \tag{19}$$

It is obvious that resolution of the recording image is changed from 600 (dpi) to 480 (dpi).

Incidentally, if only the cylinder lenses 21 and 22 in the example of design are arranged in front of the lens 7, beams output from the lens 7 cannot be provided as parallel beams in the main scanning direction because the optical distance between the lenses 6 and 7 is not equal to fL1+fL2 due to the thicknesses of the cylindrical lenses 21 and 22. The plano-convex lens 23 in the resolution converting lens system 24 has a role to correct the output beams from the lens 7 into parallel beams. The position of the plano-convex lens 23 arranged is decided by the following expression (A):

$$a^2+(HHS3+\delta) \cdot a-(HHS3+\delta) \cdot fS3=0 \tag{A}$$

in which a is the distance from the position of the front focal point of rear one of the lenses constituting the beam expander in the optical system to the position of the input side principal surface of the spherical lens (plano-convex lens), fS3 is the focal length of the spherical lens (plano-convex lens), HHS3 is the distance between the input side and output side principal surfaces of the spherical lens (plano-convex lens).

In the expression (A), δ is given by the following expression (B):

$$\delta=(t1+t2)-(n1 \cdot t2+n2 \cdot t1)/(n1 \cdot n2) \tag{B}$$

in which n1 is the refractive index of the first cylindrical lens, n2 is the refractive index of the second cylindrical lens, t1 is the thickness of the center of the first cylindrical lens, and t2 is the thickness of the center of the second cylindrical lens.

In the expression (A), δ is the optical path length correction amount based on the lens thicknesses of the cylindrical lenses 21 and 22. When the refractive indices n1=n2=1.5 and the lens thicknesses t1=t2=3 (mm) are substituted in the expression (B) which is an equation for calculating δ, δ is calculated as δ=2 (mm). When the refractive index and lens thickness of the plano-convex lens 23 are 1.5 (mm) and 3 (mm) respectively, HHS3 which is the distance between the input side and output side principal surfaces of the plano-convex lens 23 is calculated as HHS3=1 (mm). When these numerical values and fS3=4000 (mm) are substituted in the expression (A), the following equation (A') is obtained.

$$a^2+3a-12000=0 \qquad (A')$$

When the equation (A') is solved, two solutions a=108.05 (mm) and a=-111.05 (mm) are obtained. Of the two solutions, a=108.05 (mm) is used as a practical solution for expressing the distance from the position of the front focal point of the lens 7 to the position of the input side principal surface of the plano-convex lens 23 as shown in FIG. 5.

Incidentally, the thus calculated value of a which expresses the distance from the position of the front focal point of the lens 7 to the position of the input side principal surface of the plano-convex lens 23 is only a design value. When optical components are assembled in practice, it is impossible to make the value of a coincident with the design value perfectly. In the system, however, tolerance of a is so dull that there is no problem even in the case where the practical range of a has a width of approximately ±10%. That is, even in the case where the real value of a is in a range of from about 97.2 (mm) to about 118.9 (mm) on the assumption that the design value of a is 108.05 (mm), the real value of a is at a level capable of being practically allowed because it has no large influence on beam spots formed as an image on the photosensitive drum.

As is obvious from the example of design, when resolution of the recording image is changed, the magnification of the optical system in the subsidiary scanning direction is changed to (600/480)=1.25 times as large as the original magnification of the optical system. That is, $m_{sub}'$ is equal to $(\alpha/\beta)m_{sub}$ when $m_{sub}$ is the total magnification of the optical system in the subsidiary scanning direction at resolution of α (dpi), and $m_{sub}'$ is the total magnification of the optical system in the subsidiary scanning direction at resolution of β (dpi). On the other hand, the magnification of the optical system in the main scanning direction can be designed relatively freely if it is not larger than (600/480) times as large as the original magnification of the optical system. Hence, the magnification of the optical system in the main scanning direction can be generally designed to be in a range satisfying $m_{main}'<(\alpha/\beta)m_{main}$ and satisfying $m_{main} \leq m_{main}'$ to provide the lower limit for preventing the beam spots formed as an image in the main scanning direction from becoming smaller than the original beam spots when $m_{main}$ is the total magnification of the optical system in the main scanning direction at resolution of α (dpi), and $m_{main}'$ is the total magnification of the optical system in the main scanning direction at resolution of β (dpi).

That is, the magnification of the optical system in the main scanning direction can be designed to satisfy the condition $m_{main}<m_{main}'\leq(\alpha/\beta)m_{main}$. The expression (14) satisfies this condition. In this case, if the rate of change of the magnification of the optical system in the main scanning direction is set to be relatively low as represented by the expression (14) so that $m_{main}'$ approaches $m_{main}$, the chief rays of the beams can be prevented from being spread in the main scanning direction in the incident surface of the rotary polygon mirror because the synthetic focal length of the lens 7 and the resolution converting lens system 24 is little changed compared with the focal length of only the lens 7. Hence, there can be solved the problem that a wide scanning region cannot be retained because the beams are partially shaded by the edge of the reflection surface of the rotary polygon mirror. Hence, a wide scanning region can be achieved.

Figure 6:
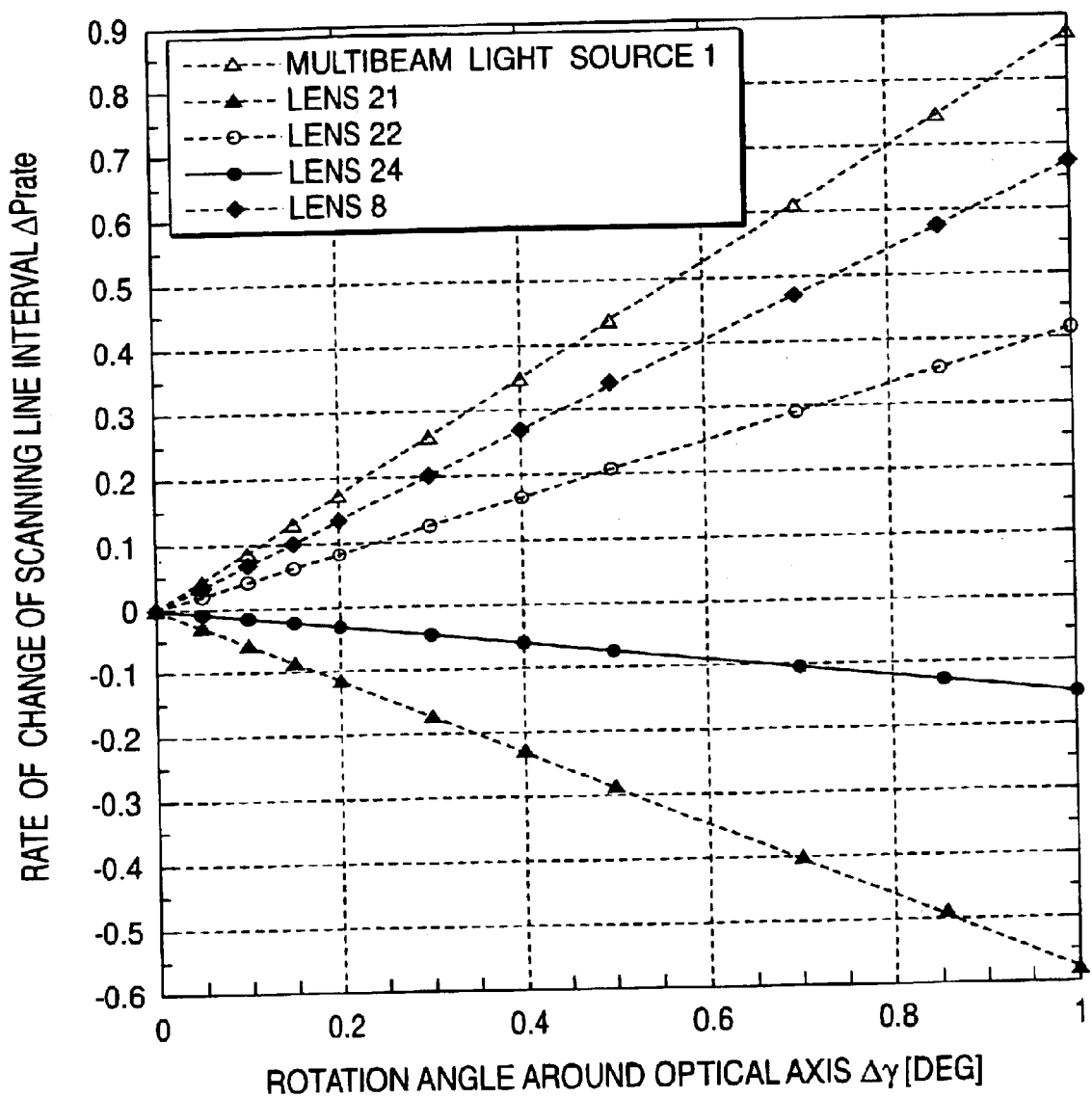
FIG. 6 is a graph showing error sensitivity in constituent components of the optical system arranged around an optical axis.

Incidentally, FIG. 6 shows the rate ΔPrate of change of the scanning line interval versus the rotation angle Δγ of each of constituent components of the optical system around the optical axis. As is obvious from FIG. 6, the rate of change of the scanning line interval due to the rotation of the resolution converting lens system 24 around the optical axis is lower in sensitivity than the rate of change of the scanning line interval due to the rotation of other optical components. Even in the case where the rate of change of the scanning line interval due to the rotation of the resolution converting lens system 24 around the optical axis is -0.155 (1/deg), that is, the resolution converting lens system 24 is rotated by 1 (deg), the scanning line interval is changed from p'=52.9 (μm) by only -0.155×52.9=-8.2 (μm), that is, changed to 52.9-8.2=44.7 (μm). Because the rotation of the resolution converting lens system 24 around the optical axis has no influence on the image surface on the photosensitive drum, an adjusting unit independent at 480 (dpi) and lower in sensitivity than the adjustment of the scanning line interval due to other components, that is, an easy and tolerant adjusting unit can be achieved by the rotation of the resolution converting lens system 24 around the optical axis.

The characteristic of the resolution converting lens system is generalized as follows. In the optical recording apparatus according to the invention, adjustment of the scanning line interval which is easy and tolerant and which is performed independently in the optical system after conversion of resolution can be achieved by adjustment of the rotation of the resolution converting lens system when the resolution converting lens system 24 is arranged in a position where the rotation angle of the resolution converting lens system 24 around the optical axis and the rate of change of the scanning line interval satisfy the following expression (C):

$$0\leq|\Delta Prate/\Delta\gamma|<\tfrac{1}{2} \qquad (C)$$

in which Δ Prate is the rate of change of the scanning line interval in accordance with the rotation of the resolution converting lens system around the optical axis, and Δγ is the rotation angle (deg) of the resolution converting lens system around the optical axis.

In this manner, there can be provided a method of adjusting the scanning line interval independently in accordance with resolution of the recording image.

Although the embodiment has shown the case where three beams are used in the optical recording apparatus, the number of beams is not limited thereto and three or more beams may be used.

Embodiment 2

Figure 7:
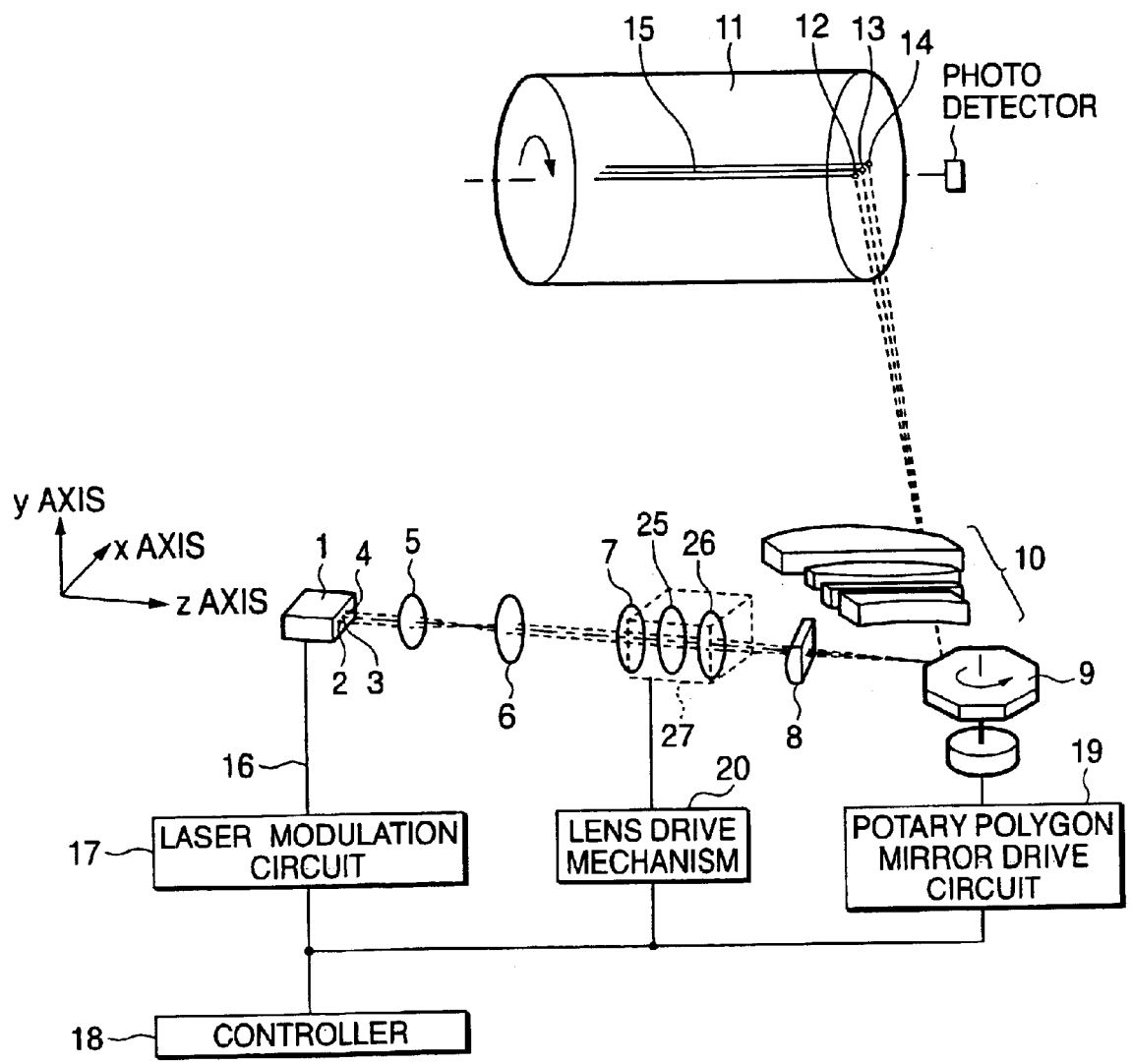
FIG. 7 is a schematic diagram showing the overall configuration of an optical recording apparatus according to the invention.

FIG. 7 is a diagram showing the overall configuration of an optical system in an optical recording apparatus according to a second embodiment of the invention.

A multibeam light source 1 for emitting a plurality of beams emits individual beams 2 to 4 independently modulated in accordance with a print data signal 16. (In this embodiment, configuration of three beams is shown as an example). The beams emitted from the multibeam light source 1 are collimated by a lens 5 and then enter a lens 6. The beams are converted into parallel beams with enlarged beam widths by a beam expander which is constituted by a combination of the lens 6 and a lens 7.

Then, the beams are transmitted through a cylindrical lens 8 having lens power only in a subsidiary scanning direction. Then, the beams are converged by a rotary polygon mirror 9 and a scanning lens 10 to thereby form an image as a column of beam spots on a photosensitive drum 11. The beam spots individually modulated are scanned to thereby perform optical recording on the photosensitive drum 11. On this occasion the plurality of beam spots 12 to 14 formed as an image on the photosensitive drum 11 are formed to have an inclination angle so that scanning lines constituted by the image-forming beam spots respectively come near to one another. The inclination angle is set by adjustment of the rotation of the multibeam light source 1 around the optical axis. A cylindrical lens 8 disposed in front of the rotary polygon mirror 9 is provided in order to eliminate displacement of the scanning lines in a subsidiary scanning direction due to the fluctuation of the rotary polygon mirror 9 at the time of rotation of the rotary polygon mirror 9. The respective beams are narrowed in the subsidiary scanning direction onto a surface of the rotary polygon mirror 9 by the cylindrical lens 8.

FIGS. 2 and 3 are detailed diagrams showing the positions of arranged components in the optical system shown in FIG. 1. FIG. 2 shows the optical system viewed in a plane of rotation of the rotary polygon mirror 9, that is, the optical system viewed in a main scanning direction on the photosensitive drum 11. FIG. 3 shows the optical system viewed in a direction perpendicular to the main scanning direction, that is, the optical system viewed in a subsidiary scanning direction.

In FIGS. 2 and 3, when the focal lengths of the lenses 5, 6, 7 and 8 are fcol, fL1, fL2 and fcyl respectively, the distance between the multibeam light source 1 and the lens 5, the distance between the lenses 5 and 6, he distance between the lenses 6 and 7 and the distance between the lens 7 and the rotary polygon mirror 9 are arranged to be substantially equal to fcol, fcol+fL1, fL1+fL2 and fL2 respectively. In the arrangement, in FIG. 2, the chief rays of the laser beams emitted in parallel with one another from the multibeam light source 1 become parallel with one another again after they exit from the lens 6, so that the lens 7 is irradiated with the parallel rays. The chief rays of the beams then exiting from the lens 7 can be substantially coincident with predetermined positions on the rotary polygon mirror 9. Hence, even in the case where a plurality of beams are used, a related-art rotary polygon mirror can be used without necessity of increasing the size of the rotary polygon mirror 9.

Next, the laser beams emitted from the multibeam light source 1 will be described with reference to FIG. 2.

When the size of each of the beam spots emitted from the multibeam light source 1 and the interval between adjacent ones of the beams are $\delta$ ($\mu$m) and $d_{main}$ (mm) respectively, the size D of each of output beams from the lens 7 is given by the following expression:

$$D = 4 \cdot \lambda \cdot fcol \cdot fL2/(fL1 \cdot \pi \cdot \delta) \text{ (mm)} \quad (1)$$

in which $\lambda$ is the wavelength of the light beam.

On the other hand, the optical system viewed in the subsidiary scanning direction in FIG. 3 is equal to the optical system in FIG. 2 in that beams output from the lens 7 become parallel light beams with a beam size $D = 4 \cdot \lambda \cdot fcol \cdot fL2/(fL1 \cdot \pi \cdot \delta)$ (mm). In the optical system in FIG. 3, however, the beams output from the lens 7 are narrowed onto the rotary polygon mirror 9 by the cylindrical lens 8. When the size (vertical size) of each of the spots narrowed in the subsidiary scanning direction onto the rotary polygon mirror 9 on this occasion is $\delta'(\mu m)$, $\delta'$ is given by the following expression.

$$\delta' = ((fL1 \cdot fcyl)/(fcol \cdot fL2))\delta (\mu m) \quad (2)$$

When the interval between adjacent ones of the spots narrowed in the subsidiary scanning direction onto the rotary polygon mirror 9 is P, P has relation to the following expression.

$$P \propto ((fL1 \cdot fcyl)/(fcol \cdot fL2)) \quad (3)$$

Hence, as shown in FIG. 4, beam spots each having a horizontal size D (mm) and a vertical size $\delta'$ ($\mu$m) and arranged at intervals of P are formed on a reflection surface of the rotary polygon mirror 9.

The beams reflected by the rotary polygon mirror 9 form an image on the photosensitive drum 11 through the scanning lens 10. When the focal length of the scanning lens 10 on this occasion is fF$\theta$, the size of each of spots formed as an image on the photosensitive drum is given by the following expressions:

$$\omega x = ((fL1 \cdot fF\theta)/(fcol \cdot fL2))\delta(\mu m) \quad (4)$$

$$\omega y = m\delta' = m((fL1 \cdot fcyl)/(fcol \cdot fL2))\delta(\mu m) \quad (5)$$

in which $\omega x$ is the size of each of the spots formed as an image in the main scanning direction, $\omega y$ is the size of each of the spots formed as an image in the subsidiary scanning direction, and m is the magnification of the scanning lens 10 in the subsidiary scanning direction.

That is, the total magnification of the optical system is given by the following expressions:

$$m_{main} = \omega x/\delta = ((fL1 \cdot fF\theta)/(fcol \cdot fL2)) \quad (6)$$

$$m_{sub} = \omega y/\delta = m((fL1 \cdot fcyl)/(fcol \cdot fL2)) \quad (7)$$

in which $m_{main}$ is the total magnification of the optical system in the main scanning direction, and $m_{sub}$ is the total magnification of the optical system in the subsidiary scanning direction.

As will be described later, the column of spots formed as an image and arranged on the photosensitive drum 11 forms a low angle with respect to the scanning line. Hence, when the interval between adjacent ones of beam spots formed as an image is d', d' is approximately given by the following expression (8) in accordance with the expression (5).

$$d_{main}' \approx m_{main} \cdot d_{main} = d_{main} \cdot ((fL1 \cdot fF\theta)/(fcol \cdot fL2)) \text{ (mm)} \quad (8)$$

When the inclination of image-forming multibeam spots with respect to the beam scanning direction is $\psi$, the scanning line interval p' is given by the following expression.

$$p' = d_{main}' \cdot \sin \psi = d_{main} \cdot ((fL1 \cdot fF\theta)/(fcol \cdot fL2)) \cdot \sin \psi \text{(mm)} \quad (9)$$

Assume now the case where resolution of a recording image in the optical system is changed from the existing value $\alpha$ (dpi) to $\beta$ (dpi).

The condition necessary for the conversion of resolution is that both the size of each of the image-forming spots in the subsidiary scanning direction and the scanning line interval as represented by the expressions (5) and (9) are changed to ($\alpha/\beta$) times. Because the time for modulating the spots formed as an image can be electrically selected in the main scanning direction, optically change of the size of each of the image-forming spots in the main scanning direction given by the expression (9) is not always necessarily performed in the same manner as in the subsidiary scanning direction. That is, the size of each of the image-forming spots in the main scanning direction need not be changed to ($\alpha/\beta$) times if it can be changed to a value which is not smaller than the existing value ωx and not larger than (α/β) times as large as the existing value ωx.

It is obvious from the expressions (5) and (9) that either of fL1 and fFθ needs to be changed to ((α/β) times or any one of fcol, fL2 and sin ψ needs to be changed to (β/α) times in order to change both the size of each of the image-forming spots in the subsidiary scanning direction and the scanning line interval to (α/β) times simultaneously.

In the optical system shown in FIG. 7, for conversion of resolution, a resolution converting lens system 27 constituted by lenses 25 and 26 is newly inserted in an optical path in the rear of the lens 7 so that the focal length in the subsidiary scanning direction of the lens 7 having a focal length fL2 can be changed to (β/α)fL2 which is the synthetic focal length of the lens 7 and the lens system 27.

Incidentally, as shown in FIG. 7, for conversion of resolution, the resolution converting lens system 27 is attached/detached into/from the optical path by a lens drive mechanism 20 on the basis of a signal given by a controller 18. Further, when resolution needs to be converted while the processing speed of the optical recording apparatus is kept constant, the rotational speed of the rotary polygon mirror 9 is also changed to (β/α) times by a rotary polygon mirror drive circuit 19 on the basis of a data signal given from the controller 18.

Assume now the case where the resolution of 600 (dot/inch) of the optical recording apparatus is converted into resolution of 480 (dot/inch) by substitution of specific numerical values for the variables in the optical system.

First, assume that the optical recording apparatus has resolution of 600 (dot/inch). When the size of each of beam spots emitted from the multibeam light source 1, the beam interval, the focal length fcol of the lens 5, the focal length fL1 of the lens 6, the focal length fL2 of the lens 7, the focal length fcyl of the lens 8, the focal length fFθ of the lens 10 and the magnification $\underline{m}$ of the lens 10 are 5 (μm), 0.15 (mm), fcol=20 (mm), fL1=200 (mm), fL2=400 (mm), fcyl=200 (mm), fFθ=400 (mm) and m=2 (times) respectively, the interval between adjacent ones of beam spots formed as an image on the photosensitive drum 11 is given as follows.

$$d_{main}'=1.5 \text{ (mm)} \tag{10}$$

The total magnification $m_{main}$ of the optical system in the main scanning direction, the total magnification $m_{sub}$ of the optical system in the subsidiary scanning direction, the size ωx of each of the spots formed as an image in the main scanning direction and the size ωy of each of the spots formed as an image in the subsidiary scanning direction are given as follows.

$$m_{main}=10 \text{ (times)} \tag{11}$$

$$m_{sub}=10 \text{ (times)} \tag{12}$$

$$\omega x=50 \text{ (μm)} \tag{13}$$

$$\omega y=50 \text{ (μm)} \tag{14}$$

When the angle ψ of the column of spots formed as an image on the photosensitive drum 11 with respect to the scanning line is set as ψ=1.617 (deg), the scanning line interval p' is calculated on the basis of the expression (9) as follows.

$$p'=0.15 \cdot ((200 \cdot 400)/(20 \cdot 400)) \cdot \sin 1.617=42.3 \text{ (μm)} \tag{15}$$

This scanning line interval p' corresponds to resolution of 600 (dot/inch).

Next, the case where resolution of the recording image in the optical system is changed from 600 (dpi) to 480 (dpi) will be examined.

In this case, the necessary condition is that the scanning line interval is changed to (600/480) times. This necessary condition can be achieved when either of fL1 and fFθ is changed to (600/480) times or either of fcol and fL2 is changed to (480/600) times.

Figure 8:
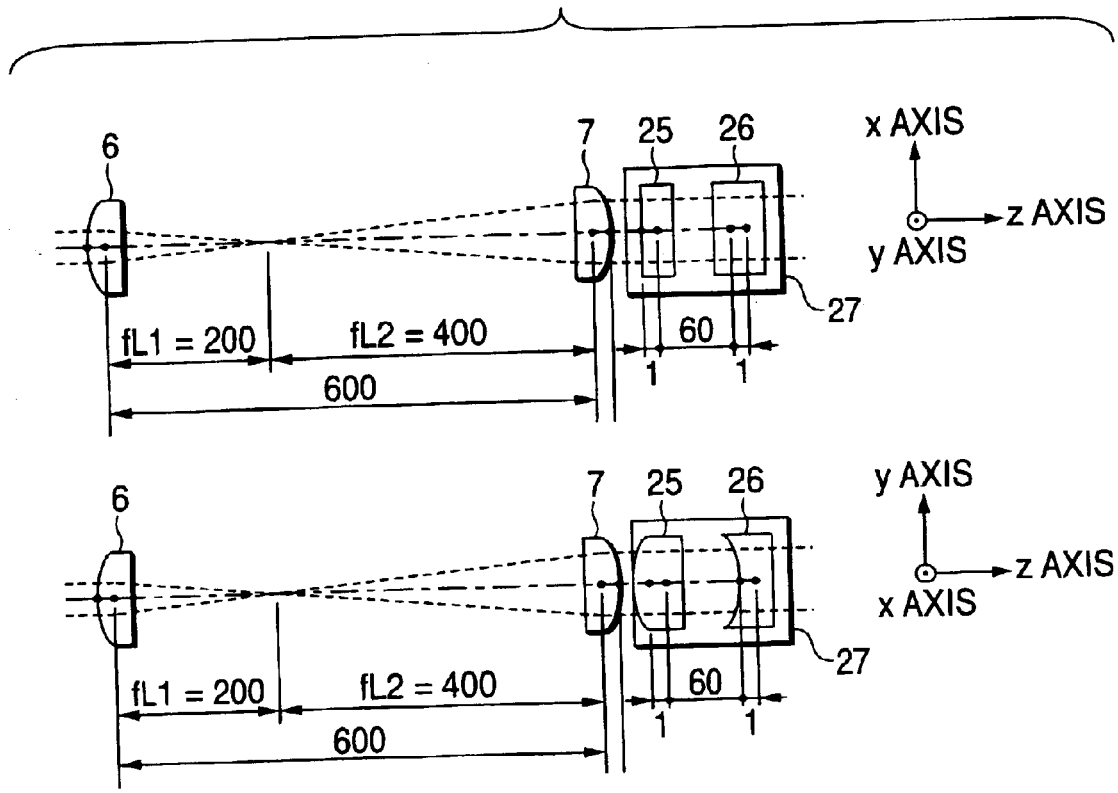
FIG. 8 is a view showing an example of the resolution converting lens system.

FIG. 8 shows an example of design in the invention. In the optical system shown in FIG. 8, a resolution converting lens system 27 constituted by a cylindrical lens 25 with a focal length fs4=300 (mm) and a cylindrical lens 26 with a focal length fs5=−240 (mm), that is, constituted by two lenses in total, is newly provided in the rear of the lens 7 which is one of lenses 6 and 7 constituting a beam expander. Hence, the synthetic focal length of the lens 7 and the resolution converting lens system 27 is unchanged in the main scanning direction (x-direction in FIG. 8), that is, changed to one time in the main scanning direction (x-direction in FIG. 8) and to 0.8 times in the subsidiary scanning direction (y-direction in FIG. 8). Hence, the scanning line interval on the photosensitive drum is changed to (600/480) times as large as the expression (15), that is, p'=52.9 (μm). On the other hand, in this case, the total magnification $m_{main}'$ of the optical system in the main scanning direction, the total magnification $m_{sub}'$ of the optical system in the subsidiary scanning direction, the size ωx' of each of the spots formed as an image in the main scanning direction and the size ωy' of each of the spots formed as an image in the subsidiary scanning direction are calculated on the basis of the expressions (4) to (7) as follows.

$$m_{main}'=10 \text{ (times)} \tag{16}$$

$$m_{sub}'=12.5 \text{ (times)} \tag{17}$$

$$\omega x'=50 \text{ (μm)} \tag{18}$$

$$\omega y'=62.5 \text{ (μm)} \tag{19}$$

It is obvious that resolution of the recording image is changed from 600 (dpi) to 480 (dpi).

Incidentally, the cylindrical lenses 25 and 26 arranged in the rear of the lens 7 can be combined optionally if the resolution converting lens system 27 satisfies the following expressions (F) and (G):

$$b=fS1+fS2 \tag{F}$$

$$|fS2/fS1|=\beta/\alpha \tag{G}$$

in which $\underline{b}$ is the distance between principal surfaces of the cylindrical lenses constituting the resolution converting lens system, fS1 is the focal length of front one of the cylindrical lenses constituting the resolution converting lens system, and fS2 is the focal length of rear one of the cylindrical lenses constituting the resolution converting lens system.

When the cylindrical lens 25 with a focal length fs4=300 (mm) and the cylindrical lens 26 with a focal length fs5=−240 (mm) are used as described above, the distance b between the principal surfaces of the cylindrical lenses is calculated as b=(300)+(−240)=60 (mm) on the basis of the expression (F). In this case, the expression (G) is also satisfied because |fS1/fS2| is equal to |−240/300|=0.8 (=480/600). Incidentally, in this embodiment, the distance between the lens 7 and the resolution converting lens system 27 can be selected optionally because the resolution converting lens system 27 is disposed in the rear of the lens 7 from which parallel beams exit.

As is obvious from the description, when resolution of the recording image is changed on the basis of the embodiment, the magnification of the optical system in the subsidiary scanning direction is changed to (600/480)=1.25 times as large as the original magnification of the optical system. That is, $m_{sub}'$ is equal to $(\alpha/\beta)m_{sub}$ when $m_{sub}$ is the total magnification of the optical system in the subsidiary scanning direction at resolution of $\alpha$ (dpi), and $m_{sub}'$ is the total magnification of the optical system in the subsidiary scanning direction at resolution of $\beta$ (dpi).

On the other hand, the magnification of the optical system in the main scanning direction is unchanged from the original magnification of the optical system. Hence, the provision of the resolution converting lens system 27 can prevent the chief rays of the beams from being spread in the main scanning direction in the incident surface of the rotary polygon mirror. Hence, there can be solved the problem that a wide scanning region cannot be retained because the beams are partially shaded by the edge of the reflection surface of the rotary polygon mirror. Hence, a wide scanning region can be achieved.

Figure 9:
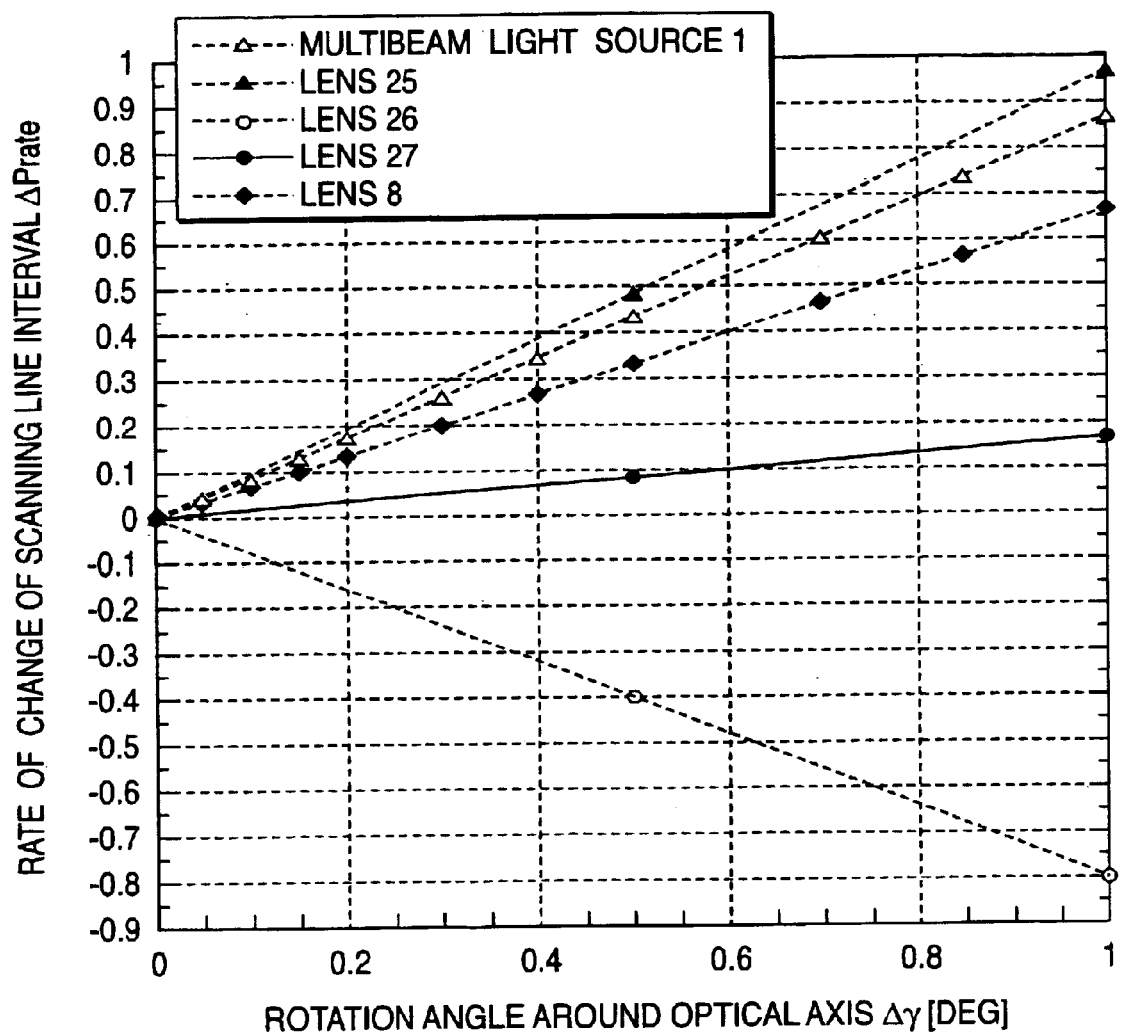
FIG. 9 is a graph showing error sensitivity in constituent components of the optical system arranged around an optical axis.

Incidentally, FIG. 9 shows the rate Δ Prate of change of the scanning line interval versus the rotation angle Δγ of each of constituent components of the optical system around the optical axis. As is obvious from FIG. 9, the rate of change of the scanning line interval due to the rotation of the resolution converting lens system 27 around the optical axis is lower in sensitivity than the rate of change of the scanning line interval due to the rotation of other optical components. Even in the case where the rate of change of the scanning line interval due to the rotation of the resolution converting lens system 27 around the optical axis is –0.175 (1/deg), that is, the resolution converting lens system 27 is rotated by 1 (deg), the scanning line interval is changed from p'=52.9 ($\mu$m) by only –0.175×52.9=–9.3 ($\mu$m), that is, changed to 52.9–9.3=43.6 ($\mu$m).

Because the rotation of the resolution converting lens system 27 around the optical axis has no influence on the image surface on the photosensitive drum, an adjusting unit independent at 480 (dpi) and lower in sensitivity than the adjustment of the scanning line interval due to other components, that is, an easy and tolerant adjusting unit can be achieved by the rotation of the resolution converting lens system 27 around the optical axis.

The characteristic of the resolution converting lens system is generalized as follows. In the optical recording apparatus according to the invention, adjustment of the scanning line interval which is easy and tolerant and which is performed independently in the optical system after conversion of resolution can be achieved by adjustment of the rotation of the resolution converting lens system when the resolution converting lens system 27 is arranged in a position where the rotation angle of the resolution converting lens system 27 around the optical axis and the rate of change of the scanning line interval satisfy the following expression (C):

$$0 \leq |\Delta P\text{rate}/\Delta\gamma| < \tfrac{1}{2} \tag{C}$$

in which Δ Prate is the rate of change of the scanning line interval in accordance with the rotation of the resolution converting lens system around the optical axis, and Δγ is the rotation angle (deg) of the resolution converting lens system around the optical axis.

In this manner, there can be provided a method of adjusting the scanning line interval independently in accordance with resolution of the recording image.

Although the embodiment has shown the case where three beams are used in the optical recording apparatus; the number of beams is not limited thereto and three or more beams may be used.

As described above, in accordance with the invention, in an optical recording apparatus for performing optical recording by forming an image from a plurality of beams on a photosensitive drum and scanning the plurality of beams, images different in resolution can be recorded. In addition, the beam spots formed as an image on the photosensitive drum and the scanning line interval can be adjusted independently in accordance with resolution by an easy and tolerant adjusting unit.

What is claimed is:

1. An optical recording apparatus comprising:

an optical system; and a photosensitive drum on which multibeam laser light is focused through the optical system to form an image as a column of image-forming beam spots, the column of image-forming beam spots being arranged obliquely on the photosensitive drum and scanned to perform optical recording;

wherein:

the optical system includes at least one beam expander and a resolution converting lens system;

the beam expander comprises a front lens and a rear lens;

the resolution converting lens system is detachably attached into the optical system;

the resolution converting lens system includes a spherical lens and first and second cylindrical lenses having lens power only in a subsidiary scanning direction;

the spherical lens includes an input side principal surface and an output side principal surface; and the spherical lens is disposed in a position such that $\underline{a}$ satisfies expressions (A) and (B)

$$a^2 + (HHS3+\delta)\cdot a - (HHS3+\delta)\cdot fS3 = 0 \tag{A}$$

$$\delta = (t1+t2) - (n1\cdot t2 + n2\cdot t1)/(n1\cdot n2) \tag{B}$$

in which $\underline{a}$ is a distance from a front focal point of the rear lens to the input side principal surface, fS3 is a focal length of the spherical lens, HHS3 is a distance between the input side principal surface and the output side principal surface, n1 is a refractive index of the first cylindrical lens, n2 is a refractive index of the second cylindrical lens, t1 is a thickness of a center of said first cylindrical lens, and t2 is a thickness of a center of the second cylindrical lens.

2. The optical recording apparatus according to claim 1, further comprising:

a rotating mechanism for adjusting rotation of the resolution converting lens system around an optical axis thereof to adjust a scanning line interval on the photosensitive drum;

wherein:

the resolution converting lens system is controlled to convert total magnification of the optical system to satisfy a condition represented by expressions (C) and (D) for change of resolution of the recording image from $\alpha$ (dpi) to $\beta$ (dpi)

$$m_{main} < m_{main}' \leq (\alpha/\beta) m_{main} \tag{C}$$

$$m_{sub}' = (\alpha/\beta) m_{sub} \tag{D}$$

in which $m_{main}$ is total magnification of the optical system in a main scanning direction at resolution of $\alpha$ (dpi), $m_{sub}$ is total magnification of the optical system in a subsidiary scanning direction at resolution of $\alpha$ (dpi), $m_{main}'$ is total magnification of the optical system in the main scanning direction at resolution of β (dpi), and $m_{sub}'$ is total magnification of the optical system in the subsidiary scanning direction at resolution of β (dpi); and when the resolution of the recording image is changed from α (dpi) to β (dpi), the resolution converting lens system is disposed in a position where a rotation angle of the resolution converting lens system around the optical axis and a rate of change of the scanning line interval satisfy an expression (E)

$$0 \leq |\Delta Prate/\Delta\gamma| < \frac{1}{2} \quad (E)$$

in which Δ Prate is the rate of change of the scanning line interval in accordance with the rotation of the resolution converting lens system around the optical axis, and Δγ is the rotation angle (deg) of the resolution converting lens system around the optical axis.

3. The optical recording apparatus according to claim 1, further comprising:

a controller for controlling the resolution converting lens system to attach into and detach from the optical system;

wherein the optical system comprises a rotary polygon mirror;

the controller controls a rotational speed of the rotary polygon mirror and a modulating speed of the image-forming beam spots scanned on the photosensitive drum; and the controller controls the resolution converting lens system while changing the rotational speed of the rotary polygon mirror and the modulating speed of the image-forming beam spots to (β/α) times to thereby change the resolution of the recording image from α (dpi) to β (dpi).

4. An optical recording apparatus comprising:

an optical system;

a photosensitive drum on which multibeam laser light is focused through the optical system to form an image as a column of image-forming beam spots, the column of image-forming beam spots being arranged obliquely on the photosensitive drum and scanned to perform optical recording; and a controller;

wherein the optical system includes at least one beam expander and a resolution converting lens system;

the beam expander comprises a front lens and a rear lens;

the resolution converting lens system is detachably attached into the optical system;

the controller controls the resolution converting lens system to attach into and detach from the optical system;

the resolution converting lens system includes a spherical lens and two cylindrical lenses both having lens power only in a subsidiary scanning direction; and the resolution converting lens system is controlled by the controller to satisfy expressions (F) and (G) to convert magnification of the optical system in a subsidiary scanning direction to thereby change resolution of the recording image from α (dpi) to β (dpi)

$$b = fS1 + fS2 \quad (F)$$

$$|fS2/fS1| = \beta/\alpha \quad (G)$$

in which $\underline{b}$ is a distance between principal surfaces of the cylindrical lenses, fS1 is a focal length of the front lens, and fS2 is a focal length of the rear lens.

5. The optical recording apparatus according to claim 4, further comprising:

a rotating mechanism for adjusting rotation of the resolution converting lens system around an optical axis thereof to adjust a scanning line interval on the photosensitive drum;

wherein:

when resolution of the recording image is changed from α (dpi) to β (dpi), the resolution converting lens system is disposed in a position where a rotation angle of the resolution converting lens system around an optical axis and a rate of change of the scanning line interval satisfy an expression (H)

$$0 \leq |\Delta Prate/\Delta\gamma| < \frac{1}{2} \quad (H)$$

in which Δ Prate is the rate of change of the scanning line interval in accordance with the rotation of the resolution converting lens system around the optical axis, and Δγ is the rotation angle (deg) of the resolution converting lens system around the optical axis.

6. The optical recording apparatus according to claim 4, wherein the optical system comprises a rotary polygon mirror;

the controller controls a rotational speed of the rotary polygon mirror and a modulating speed of the image-forming beam spots scanned on the photosensitive drum; and the controller controls the resolution converting lens while changing the rotational speed of the rotary polygon mirror and the modulating speed of the image-forming beam spots to (β/α) times to thereby change resolution of the recording image from α (dpi) to β (dpi).

7. An optical recording apparatus comprising:

an optical system;

a photosensitive drum on which multibeam laser light is focused through the optical system to form an image as a column of image-forming beam spots, the column of image-forming beam spots being arranged obliquely on the photosensitive drum and scanned to perform optical recording; and a rotational mechanism;

wherein:

the optical system includes a resolution converting lens system which is detachably attached into the optical system; and the rotating mechanism adjusts rotation of the resolution converting lens system around an optical axis thereof.

8. The optical recording apparatus according to claim 7, wherein the resolution converting lens system is rotated by the rotating mechanism to change of resolution of the recording image.

9. The optical recording apparatus according to claim 7, wherein the resolution converting lens system is attached into and detached from the optical system to change of resolution of the recording image.

* * * * *